2,866,784

PROCESS FOR OBTAINING VOACANGA ALKALOIDS

Léon Gillo, Brussels-Ixelles, and Jean Mainil, Boitsfort-Brussels, Belgium, assignors to Sorelux S. A., and Oletta S. A., both of Grand Duchy of Luxembourg, Luxembourg, both bodies corporate of Luxembourg No Drawing. Application April 17, 1956
Serial No. 578,578

Claims priority, application Great Britain June 2, 1955

2 Claims. (Cl. 260—236)

The present invention relates to a new process for obtaining pharmaceutical products. It is concerned more particularly with pharmaceutical products having cardiotonic and hypertensive action obtained from plants of the genus Voacanga and notably of the species *africana, obtusa, condiflora, factida globosa, scheinfurthii* and *tonarii*.

It has been observed that the said plants could furnish three crystalline alkaloids in pure form and with definite physical and pharmocodynamic characteristics, possessing a cardiotonic action equal to that of digitoxin, mildly hypertensive and having a toxicity (100–120 mg./kg.) much less than that of digitalin (2.5 mg./kg.), even though the total alkaloid extracts of Voacanga varieties are very toxic (3.8 mg./kg.) and are hypotensors.

This strong cardiotonic activity and this low toxicity are absent in other definite cardiotonic substances known at present such as digitalin, strophantine, the scillarenosides and the other cardiotonic plant extracts.

The first of these alkaloids which will be referred to herein as "Alkaloid A" or "Voacangine" corresponds substantially to the formula $C_{22}H_{28}O_3N_2$ and has the analysis of about 71.6% carbon, 7.7% oxygen and 7.3% nitrogen. It exists in the form of white crystals very soluble in chloroform, benzene, and acetone, of low solubility in methanol, ethanol, and the dilute solutions of organic and inorganic acids, and of very low solubility in petroleum ether, and insoluble in water. The ultra-violet spectrum of alkaloid A has two maximum at 225 mu and 288 mu and a minimum at 256 mu while its infra-red spectrum (in a crystal of potassium bromide) shows bands at 2.95, 3.43, 5.87, 6.27, 6.73, 6.89, 7.01, 7.23, 12.04 and 12.31$\mu$. The crystals of alkaloids A melt at 136–137° C. (corrected, in capillary).

The second alkaloid which will be referred to herein as "Alkaloid B" or "Voacamine" corresponds approximately with the formula $C_{44}H_{52}O_5N_4$ and has an analysis of about 73.45% carbon, 7.55% hydrogen, 7.87% nitrogen and 12.26% of methoxy groups. It exists in the form of small white crystals, very soluble in chloroform, benzene, and acetone, slightly soluble in methanol, ethanol, and dilute solutions of organic and inorganic acids, very slightly soluble in petroleum ether, and insoluble in water. The ultra-violet spectrum of alkaloid B has two maxima at 225 mu and 295 mu and a minimum at 256 mu, while its infra-red spectrum (in a crystal of potassium bromide) shows bands at 2.95, 3.44, 5.80, 6.85, 7.23, and 13.6$\mu$. The crystals of alkaloid B melt at 222–223° C. (corrected, in capillary).

The third alkaloid which will be referred to herein as "Alkaloid C" or "Vobtusine" corresponds substantially to the formula $C_{20}H_{26}O_3N_2$ and substantially has the analysis 71.06% carbon, 7.02% hydrogen, 7.76% nitrogen and 9.3% of methoxy groups. It exists in the form of white crystals soluble in chloroform and carbon tetrachloride and nearly insoluble in acetone, methanol, benzene, and petroleum ether. The ultra-violet spectrum of alkaloid C has maxima at 220, 266, 301, and 325 mu, while its infra-red spectrum (in a crystal of potassium bromide) shows bands at 5.95, 6.22, and 13 to 14$\mu$. The crystals of alkaloid C melt at 283° C. (corrected, in capillary).

It is to be noted that the characteristics indicated above for the alkaloids A, B and C are those which have been obtained with the most pure alkaloids which have been able to be prepared. Evidently these characteristics may vary according to the purity of the particular sample of the alkaloid prepared.

The present invention is mainly concerned with the manufacturing of these substances or of their addition or substitution salts with acids, such as hydrohalides (as hydrochloric acid, hydrobromic acid, hydriodic acid), oxyhalogenic acids (as chloric and perchloric acids), and other mineral acids, as sulphuric and phosphoric acids, and also organic carboxylic acids, as formic, acetic, propionic, butyric, benzoic and other aliphatic or cyclic monocarboxylic acids as well as organic aliphatic or cyclic polycarboxylic acids, saturated or unsaturated, as tartaric, oxalic, lactic, citric, ascorbic, and salicylic acids, and finally organic sulphonic acids, as methyl sulphonic, p-toluene sulphonic, and camphosulphonic acids.

The present invention also contemplates the manufacture of pharmaceutical preparations in a therapeutically acceptable form containing at least one of the alkaloids A, B and C and/or at least one salt of these alkaloids, in the form of injectable solutions, solutions for administration to the buccal passage, tablets, granules, suppositories, in powder and analogous forms.

An advantageous pharmaceutical preparation consists of an injectable solution of alkaloid B or of a salt of alkaloid B such as the sulphate in distilled water or physiological serum, for example in a ratio of about 1 mg. of salt to 1 cc. of solvent.

Another advantageous pharmaceutical preparation consists of a solution, administratable to the buccal passage in drops, of the alkaloid B or of a salt of this alkaloid, such as the sulphate in distilled water or physiological serum, for example in a ratio of 1 to 5 mg. of salt to a 100 drops of solvent.

Finally another advantageous pharmaceutical preparation consists of granules containing one of the alkaloids A, B and C or one of their salts with an excipient of known type such as lactose or gumarabic.

It is to be noted that the alkaloids A, B and C as well as their salts may also be utilised as intermediates for the preparation of other valuable products.

The invention also provides a method of preparing the alkaloids A, B and C and their salts starting from varieties or species of plants of the genus Voacanga.

According to the invention a plant of the genus Voacanga, particularly the finely ground roots or trunk bark of such a plant is subjected to the action of a selected solvent of the class comprising on the one hand feebly polar or non-polar organic solvents immiscible with water, and on the other hand polar organic solvents and/or water, these latter solvents being if desired added to by an organic or inorganic strong acid, the liquor obtained is subjected, after having been concentrated if desired, to at least one extraction by means of a polar organic solvent and/or water, with addition if desired of a strong organic or inorganic acid, in the case where the plant has originally been treated with a feebly polar or non-polar solvent, or with a feebly polar or non-polar organic solvent, in the case where the plant has originally been treated with a polar organic solvent or water, if desired with the addition of a strong organic or inorganic acid, and at least one alkaloid is finally separated from the extracts if desired after concentration of these extracts.

As feebly polar or non-polar solvents slightly or non-miscible with water there may be used according to the invention, ethers, such as diethyl and isopropyl ethers, hydrocarbons, such as benzene and toluene, halogenated hydrocarbons, such as dichloroethane, chloroform, methylene chloride and dichlorethylene, or esters, such as methyl or ethyl acetate. Instead of using one of these solvents alone it is of course possible to use a mixture of several of them.

As polar solvents there may be used, in accordance with the invention, alcohols, such as methanol, ethanol, and isopropanol.

As has been indicated above it is advantageous to add at least one strong organic or inorganic acid to the polar solvents or the water used for percolating the plants of the genus Voacanga or for the extraction of the percolation liquors. Among these acids may be mentioned hydrochloric, sulphuric, phosphoric, acetic, formic, propionic, lactic, tartaric and citric acids. Instead of an acid it is possible to use an acid salt of a polybasic acid such as monosodium phosphate or monosodium sulphate.

The concentration of the organic or inorganic acid in the polar solvent or in the water is ordinarily about 2 to 5% by volume.

Advantageously, according to the present invention, a plant of the genus Voacanga, particularly the finely ground roots and trunk bark of the plant, is treated by means of an aqueous or alcoholic solution of an alkaline reagent, before being subjected to the action of an organic solvent.

By virtue of this preliminary treatment the yield of alkaloids A, B and C is improved.

As alkaline reagents which may be used in aqueous or alcoholic solution for the preliminary treatment of roots or barks of plants of the genus Voacanga there may be mentioned ammonia, lime, sodium carbonate, sodium bicarbonate and soda.

A particular mode of operation for obtaining an extract containing the alkaloids A, B and C consists in treating a plant of the genus Voacanga, after preliminary treatment if desired with an alcoholic or aqueous solution or suspension of an alkaline reagent, with an alcoholic or aqueous solution of a strong organic or inorganic acid or an acid salt of a polybasic acid.

The acid solution obtained is then concentrated under ordinary or reduced pressure to a low volume, or is diluted and then extracted by means of a feebly polar or non-polar solvent of low miscibility or not miscible with water and alcohol.

The yield of this latter extraction can be increased by making alkaline the aqueous or alcoholic medium with alkaline reagents such as ammonia, lime, sodium carbonate, sodium bicarbonate, or soda.

The extract thus obtained in the feebly polar or non-polar solvent is then washed until neutral with water and is evaporated to dryness under reduced pressure.

There is thus obtained an initial product which already possesses an intense cardiotonic action.

A second particular operational method for the extraction of the cardiotonic principles of varieties of the genus Voacanga consists in extracting the finely ground plant, if desired previously treated with an aqueous or alcoholic suspension or solution of bases such as lime, ammonia, soda, and sodium carbonate, by means of a feebly polar or non-polar solvent of low or non-miscibility with water, such as volatile aliphatic and cyclic hydrocarbons (benzene, toluene, petroleum ether), halogenated hydrocarbons (dichloroethane, chloroform, methylene chloride, trichlorethylene), ethers (ethyl and isopropyl), esters (methyl and ethyl acetates and propionates), and mixtures of these solvents.

The solution obtained is concentrated under vacuum or at ordinary pressure or may be further treated without concentration.

The solution, concentrated or not, is then extracted by means of an aqueous, alcoholic, or aqueous/alcoholic solution of an organic or inorganic acid and this solution is then treated by the series of operations described in the first operational method.

Concentrated extracts thus obtained exhibit strong cardiotonic action but also have a fairly high toxicity (3.8 mg./kg.); it is possible to isolate from them at least three definite and crystallised alkaloids having a cardiotonic action as powerful as that of digitalin but having only a very low toxicity (100 to 120 mg./kg.).

The alkaloids A, B and C are separated from the concentrated extracts mentioned above by using absorption agents such as ion exchangers or by operating chromatographically.

As ion exchangers there may particularly be used exchangers of the amino-phenol, amino-sulphonic acid, carboxylic acid, and quaternary ammonium salt types.

When the separation of the alkaloids A, B and C is effected by chromatography, the concentrated extracts, dissolved in an organic solvent, such as benzene, cyclohexane, toluene, carbon tetrachloride, trichlorethylene, chloroform, dichloromethane, ethyl ether or ethyl acetate, are fixed on a chromatographic adsorption agent such as alumina, silica, silicate, starch, talc, sodium carbonate, calcium carbonate, calcium phosphate, magnesium oxide or active carbon, and are then eluted by means of an elution agent such as benzene or benzene-acetone mixtures, mixtures of benzene and ethyl acetate, mixtures of benzene and di-isopropyl ether or mixtures of benzene and methanol.

The chromatographic fractionation makes possible the separation of the alkaloids A, B and C defined above, which can be crystallised from an alcohol such as methanol or ethanol. These alkaloids can be obtained in substantially pure form by recrystallisation from a solvent such as methanol or ethanol, if desired, in a mixture with benzene, acetone or chloroform.

According to another feature of the invention salts of the alkaloids A, B and C may be prepared by the action of an acid on these alkaloids if desired in the presence of a diluting agent such as water, benzene, methanol or ethanol, alone or in admixture. These salts can also be obtained by double decomposition for example by agitation of a solution of a soluble salt of one of these alkaloids with an acid which causes precipitation of a salt of the alkaloid less soluble than the initial salt.

Thus, an aqueous solution of the sulphate of one of the alkaloids, A, B and C may be agitated with hydrochloric acid which causes precipitation of the hydrochloride which is less soluble than the sulphate.

The pharmacological activity of the alkaloids isolated is quite comparable to that of digitalin.

In comparable doses the alkaloids A, B and C give rise to the same amplitude in the contraction of the isolated little ear of the rabbit and the durations of these contractions are of quite the same order of length. Like digitalin the isolated alkaloids are mild hypertensors by constriction of the peripheral vessels. As with digitalin there is a synergistic action with calcium ions and, in low doses, no action on the coronary output.

In addition to their low toxicity, greatly inferior to that of known cardiotonics, the isolated alkaloids have the advantage over digitalin of being only slightly fixed by the cardiac fibre and consequently giving rise to only a small extent of accumulation effects; in doses 200 times greater no vomiting effect is produced in pigeons.

So far as the salts of the alkaloids A, B and C, such as the sulphate and the hydrochloride, are concerned they have the advantage over digitalin and other cardiotonic heterosides of being soluble in water and allowing the preparation of aqueous solutions injectable or administratable by the buccal passage, while digitalin and other cardiotonics must be dissolved in solvents such as glycerine or alcohol which are irritants.

The features of the method according to the invention will appear more clearly and completely in the following illustrated examples which could not be taken as being limitative.

Example 1

1000 g. of finely ground roots of *Voacanga obtusa* are percolated with 5000 cc. of a 2% solution of sulphuric acid.

The solution is neutralised to pH 8.5 by caustic soda and is then extracted once with 1000 cc. and then three times with 500 cc. of benzene. The solutions are combined and washed with water to neutrality; they are then dried by pure sodium sulphate. After having evaporated the benzene under vacuum there is obtained a powdery clear brown mass.

This mass is dissolved in 500 cc. of pure benzene and chromatographed on 1500 g. of neutral alumina. After adsorption it is eluted with benzene and there is obtained at the head a light coloured substance which crystallises directly from methanol and which can be purified by recrystallisation from methanol. This substance is alkaloid A and melts at about 130°.

When the elution is continued using benzene containing 2% and then 5% of isopropylether there is separated in the same manner a greater quantity of a white solid which crystallises directly from methanol. Two recrystallisations from a mixture of acetone and methanol give a product melting at about 220°, which is the alkaloid B.

If the chromatography is continued using benzene containing 10% and then 20% of isopropyl ether there is separated in the same manner the third akaloid C, recrystallisable from a chloroform/acetone mixture melting at about 280°.

The yield of the alkaloids thus obtained and their respective proportions are very variable according to the origin, the age, the season at which the plants were collected, etc.

Example 2

1000 g. of bark from the trunk of *Voacanga africana* are percolated by means of 6000 cc. of a solution of 5% propionic acid in ethanol. The extract is evaporated at 60–70° under vacuum to a volume of 750 cc. 750 cc. of water are added and the pH is brought to 8.5 by addition of ammonia. Extraction is then carried out once with 500 cc. and three times with 200 cc. of chloroform. The chloroform solutions are combined and washed with water until neutrality. They are then dried over dry sodium carbonate and distilled under vacuum to dryness. The alkaloids are then separated by chromatography according to the method described in Example 1.

Example 3

1000 g. of ground roots of *Voacanga africana* are percolated with 10,000 cc. of methanol. After evaporation of the methanol there is obtained a brown powder which is first washed with water so as to eliminate soluble substances. The residue is then dissolved in 500 cc. of 10% aqueous solution of acetic acid and the solution filtered.

The filtrate is made alkaline, extracted with benzene or chloroform, dried, and the alkaloids are separated following the procedures described in Examples 1 and 2.

Example 4

1000 g. of ground trunk bark from *Voacanga obtusa* are soaked with 1000 cc. of 2% ammonia and allowed to stand during 12 hours. The mass is then percolated with 6000 cc. of methanol containing 5% of acetic acid. The course of subsequent treatment is the same as in Example 2.

Example 5

1000 g. of trunk bark from *Voacanga obtusa* are soaked with 1000 cc. of 2% ammonia for 12 hours and then extracted in a Sohxlet apparatus with 5000 cc. of ethyl ether. After having dried the ether solution over anhydrous sodium sulphate and filtered the solution, evaporation is carried out to a volume of 1000 cc. and this solution is then extracted four times with portions of 375 cc. of water containing 5% tartaric acid. The extract is brought to pH 8.5 by means of sodium carbonate. Extraction is then effected with four portions of 300 cc. of chloroform which is then washed with water, dried over anhydrous sodium carbonate, and then evaporated under vacuum.

The total alkaloids dried under vacuum over phosphorus protoxide are then chromatographed in the manner described in Example 1.

Example 6

1000 g. of powdered trunk bark of *Voacanga africana* are soaked with 1000 cc. of a 1% solution of sodium carbonate for 12 hours. The powder is then dried to constant weight under vacuum at 50°, wetted with 1000 cc. of methanol and percolated with 5000 cc. of chloroform. The liquid extract is evaporated to dryness under vacuum and the powder obtained is first washed with water and then extracted three times with 700 cc. of a 5% solution of acetic acid. After filtration of the residue the acid solutions are combined and made alkaline by means of soda to a pH of 8.5, after which they are extracted with benzene and the process is completed according to the technique indicated in Example 1.

Example 7

1000 g. of ground roots of *Voacanga africana* are soaked in a percolator with 4000 cc. of ethanol containing 5% of acetic acid and left in contact for 24 hours. The acetic alcohol is then allowed to run out drop by drop at a rate of 3000 cc. per hour. When the percolation has been completed the plant is again contacted with 4000 cc. of alcohol containing 5% of acetic acid during 24 hours after which a similar percolation is again effected. The plant is squeezed free of alcohol and all the liquids are combined; they are then evaporated under vacuum and the process is continued as described in Example 2.

Example 8

The process is conducted in the same way as in Example 7 except that instead of leaving the plant in contact with the solvent for 24 hours in the cold, the plant is vigorously agitated for 5 hours at a temperature of 50° with the ethanol containing 5% of acetic acid. After this the process is continued as in Example 7.

Example 9

1 g. of alkaloid B, obtained according to one or other of the foregoing examples, is dissolved in 5 cc. of acetone. To this solution is added 5 cc. of sulphuric acid. The sulphate of alkaloid B precipitates and is filtered off and washed with water. After recrystallisation from water white crystals are obtained which are fairly soluble in water. These crystals decompose without melting at a temperature greater than 300° C.

Example 10

1 g. of the sulphate of alkaloid B, prepared as described in Example 9, is dissolved in 100 cc. of hot water. 10 cc. of Normal hydrochloric acid is added; the hydrochloride of alkaloid B precipitates. It is filtered off, washed with water, and finally recrystallised from water.

Example 11

An injectable solution is prepared by dissolving 1 mg. of the sulphate of alkaloid B in 1 cc. of distilled water or physiological serum. The solution obtained is put into ampules.

It is evident that the invention is not limited to the detailed embodiments given above and that various modifications can be made in the operative procedures described in the examples; this is particularly true with regard to the quantities and the nature of the solvents, acids, bases, chromatographic adsorption agents and other substances, while still being within the scope of the invention, which scope is defined in the appended claims.

What we claim is:

1. Process for the preparation of alkaloids pertaining to the group of Voacangine corresponding to the formula $C_{22}H_{28}O_3N_2$, Vocamine corresponding to the formula $C_{44}H_{52}O_5N_4$ and Vobtusine corresponding to the formula $C_{20}H_{26}O_3N_2$ from finely ground parts of a plant of the genus Voacanga comprises subjecting said parts to the action of a first organic solvent of the group consisting of diethyl ether, isopropyl ether, benzene, toluene, dichloroethane, chloroform, methylene chloride, dichlorethylene, methyl acetate and ethyl acetate, concentrating the liquor thus obtained, subjecting the concentrate to the action of a further organic solvent of the group consisting of methanol and ethanol having a strong acid added thereto, then separating by chromatography said alkaloids from the extract thus obtained, the chromatographic adsorption agent being selected from the group consisting of alumina, silica, starch, talc, sodium carbonate, calcium carbonate, calcium phosphate and active carbon and the elution agent being selected from the group consisting of benzene, benzene-acetone mixtures, benzene-ethyl acetate mixtures, benzene-di-isopropyl ether mixtures and benzene-methanol mixtures.

2. Process as claimed in claim 1 comprising the step of using as said strong acid, an acid of the group consisting of: hydrochloric acid, sulphuric acid, phosphoric acid, acetic acid, formic acid, propionic acid, lactic acid, tartaric acid and citric aid.

References Cited in the file of this patent

Janot et al.: Compte Rend., vol. 240, pages 1719–20 and 1800–01 (1955).